United States Patent
Montero et al.

(10) Patent No.: US 10,776,043 B2
(45) Date of Patent: Sep. 15, 2020

(54) STORAGE CIRCUITRY REQUEST TRACKING

(71) Applicant: Arm Limited, Cambridge (GB)

(72) Inventors: Adrian Montero, Austin, TX (US); Miles Robert Dooley, Austin, TX (US); Joseph Michael Pusdesris, Austin, TX (US); Klas Magnus Bruce, Leander, TX (US); Chris Abernathy, Austin, TX (US)

(73) Assignee: Arm Limited, Cambridge (GB)

( * ) Notice: Subject to any disclaimer, the term of this patent is extended or adjusted under 35 U.S.C. 154(b) by 52 days.

(21) Appl. No.: 16/118,610

(22) Filed: Aug. 31, 2018

(65) Prior Publication Data

US 2020/0073576 A1 Mar. 5, 2020

(51) Int. Cl.
*G06F 3/06* (2006.01)
*G11B 19/04* (2006.01)
*G06F 9/50* (2006.01)
*G06F 12/0862* (2016.01)
*G06F 12/0815* (2016.01)

(52) U.S. Cl.
CPC .......... *G06F 3/0653* (2013.01); *G06F 9/5016* (2013.01); *G06F 12/0862* (2013.01); *G11B 19/045* (2013.01); *G06F 12/0815* (2013.01); *G06F 2212/1016* (2013.01); *G06F 2212/602* (2013.01)

(58) Field of Classification Search
CPC .. G06F 3/0653; G06F 9/5016; G06F 12/0862; G06F 12/0815; G06F 2212/1016; G06F 2212/602

See application file for complete search history.

(56) References Cited

U.S. PATENT DOCUMENTS

| | | | |
|---|---|---|---|
| 8,909,866 B2 * | 12/2014 | Kalamatianos | G06F 12/0897 711/119 |
| 2011/0078380 A1 | 3/2011 | Gendler | |
| 2016/0283232 A1 * | 9/2016 | Sade | G06F 9/30047 |
| 2017/0286304 A1 | 10/2017 | Peled et al. | |

OTHER PUBLICATIONS

Combined Search and Examination Report for GB Application No. 1912476.7 dated May 6, 2020, 13 pages.

* cited by examiner

*Primary Examiner* — David Yi
*Assistant Examiner* — Dustin B. Fulford
(74) *Attorney, Agent, or Firm* — Nixon & Vanderhye P.C.

(57) ABSTRACT

Storage circuitry is provided, that is designed to form part of a memory hierarchy. The storage circuitry comprises receiver circuitry for receiving a request to obtain data from the memory hierarchy. Transfer circuitry causes the data to be stored at a selected destination in response to the request, wherein the selected destination is selected in dependence on at least one selection condition. Tracker circuitry tracks the request while the request is unresolved. If at least one selection condition is met then the destination is the storage circuitry and otherwise the destination is other storage circuitry in the memory hierarchy.

14 Claims, 8 Drawing Sheets

US 10,776,043 B2

STORAGE CIRCUITRY REQUEST TRACKING

TECHNICAL FIELD

The present disclosure relates to data processing. In particular, the present disclosure relates to storage circuitry.

DESCRIPTION

A memory hierarchy may consist of a number of storage circuits in the form of a plurality of caches and a main memory (e.g. backed by DRAM). At the top of the hierarchy, storage circuits are comparatively smaller and faster while at the bottom of the hierarchy, the main memory is comparatively large and slow. When a request for data 'misses' one of the storage circuits, lower level storage circuits are queried for the requested data and transferred to higher level caches when the data is found. However, only a limited number of such requests can be tracked at a time, and this limits the bandwidth of the memory system. It has previously been proposed to increase this bandwidth by increasing the capacity for tracking requests. However, this can lead to larger sized circuitry that consumes more power and reacts more slowly. It would therefore be desirable to improve the memory bandwidth while avoiding at least some of these disadvantages.

SUMMARY

Viewed from a first example configuration, there is provided storage circuitry to form part of a memory hierarchy, the storage circuitry comprising: receiver circuitry to receive a request to obtain data from the memory hierarchy; transfer circuitry to cause the data to be stored at a selected destination in response to the request, wherein the selected destination is selected in dependence on at least one selection condition; and tracker circuitry to track the request while the request is unresolved, wherein if the at least one selection condition is met then the selected destination is the storage circuitry and otherwise the selected destination is other storage circuitry in the memory hierarchy.

Viewed from a second example configuration, there is provided a method comprising: receiving, at storage circuitry, a request to obtain data from a memory hierarchy; selecting a selected destination in the memory hierarchy in dependence on at least one selection condition; causing the selected destination to obtain the data; and tracking the request while the request is unresolved, wherein if at least one selection condition is met then the selected destination is the storage circuitry and otherwise the destination is other storage circuitry.

Viewed from a third example configuration, there is provided storage circuitry to form part of a memory hierarchy, the storage circuitry comprising: means for receiving, at storage circuitry, a request to obtain data from a memory hierarchy; means for selecting a selected destination in the memory hierarchy in dependence on at least one selection condition; means for causing the selected destination to obtain the data; and means for tracking the request while the request is unresolved, wherein if at least one selection condition is met then the selected destination is the storage circuitry and otherwise the destination is other storage circuitry.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
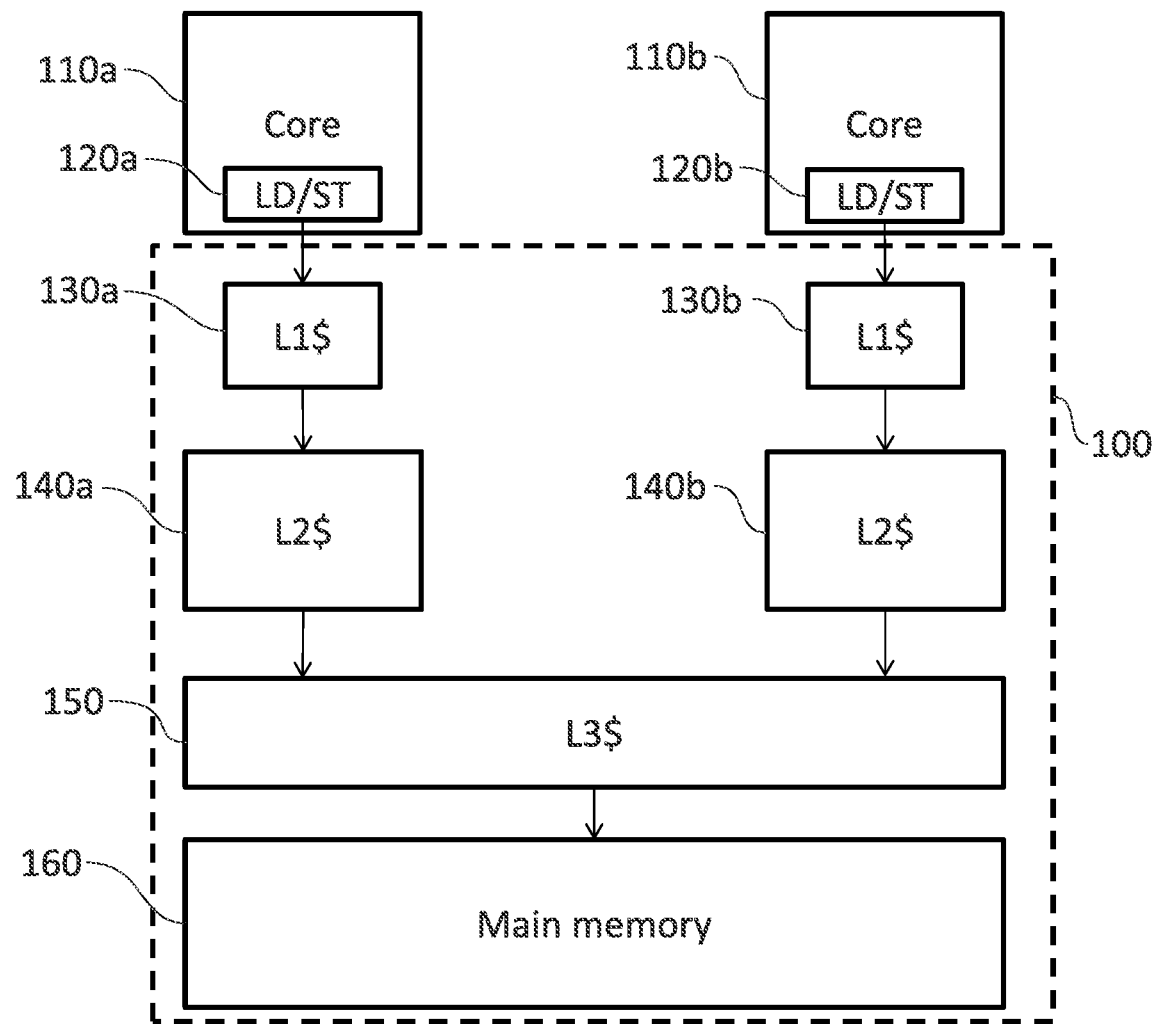
FIG. 1 illustrates a memory hierarchy in accordance with some embodiments.

Before discussing the embodiments with reference to the accompanying figures, the following description of embodiments is provided.

In accordance with one example configuration there is provided storage circuitry to form part of a memory hierarchy, the storage circuitry comprising: receiver circuitry to receive a request to obtain data from the memory hierarchy; transfer circuitry to cause the data to be stored at a selected destination in response to the request, wherein the selected destination is selected in dependence on at least one selection condition; and tracker circuitry to track the request while the request is unresolved, wherein if the at least one selection condition is met then the selected destination is the storage circuitry and otherwise the selected destination is other storage circuitry in the memory hierarchy.

In these embodiments, the storage circuitry can take the form of a cache such as a level two cache. The storage circuitry receives a request to obtain data from somewhere in the memory hierarchy. This request could be an explicit request or it could be a prefetch request to obtain the data before it is specifically required by a processor core. In such embodiments when the request for data misses in the storage circuitry, the data is obtained from the memory hierarchy. The request for the data is therefore tracked by the tracking circuitry until it can be resolved. In the above embodiments, depending on a selection condition, the data is fetched into the storage circuitry itself or is fetched into other storage circuitry. This latter option can be achieved by the request being converted into a fetch request for a lower level storage circuit. In this way, the storage circuitry is required to do less tracking—the storage circuitry need not track the request any longer because the data is being fetched into other storage circuitry. The request is therefore "handed off" to the other storage circuitry. This enables the storage circuitry to increase its memory bandwidth by effectively relying on other storage circuits in the memory hierarchy to be made responsible for fetching data. As a consequence, more requests can be active simultaneously and thus the overall bandwidth of the memory hierarchy can be improved.

In accordance with some embodiments there is provided the at least one selection condition comprises a condition that an occupancy of the tracker circuitry is below a predetermined level. Each outstanding (e.g. unresolved or in-flight) request has a corresponding entry in the tracker circuitry. Accordingly, the number of entries in the tracker circuitry restricts the number of outstanding requests that can be present and accordingly restricts the number of data transfers that can occur within the memory hierarchy. Consequently, when the occupancy (e.g. the number of entries) of the tracker circuitry is below a predetermined level, it is appropriate for the storage circuitry itself to obtain data and store it locally. Alternatively, if the occupancy of the tracker circuitry is at or above the predetermined level, then the further bandwidth usage may be limited. Accordingly, the storage circuitry may cause a storage circuit other than the storage circuitry in the memory hierarchy to obtain the requested data and store it. In this way, the request need not be represented in the tracker circuitry for an extended period of time and so more requests can be in-flight simultaneously, thereby improving the memory hierarchy bandwidth.

In some embodiments, the request to obtain data from the memory hierarchy is a prefetch request. Prefetching is process used to obtain data without any explicit request for that data being made from the processor core (e.g. processing circuitry that executes a stream of instructions). A prediction is made by a prefetcher as to data that will be required in the near future based on the explicit requests for data that have been made. Using this information, data can be fetched prior to be it being required. When the explicit request for that data is eventually made, the act of having prefetched the data will cause it to be in a higher level of the memory hierarchy. Thus, the time taken to obtain the data may be lower. This causes the memory latency (e.g. the period of time between data being explicitly requested and provided) to be reduced.

In some embodiments, the selected destination is lower in the memory hierarchy than the storage circuitry. For example, when the condition is not met, the transfer circuitry of the storage circuitry causes a storage circuit that is at a lower level of the memory hierarchy (e.g. nearer to the main memory) to be the storage circuit that obtains the data from the memory hierarchy. Typically, the act of fetching the data will cause the data to be fetched from an even lower level of the memory hierarchy (e.g. such as a main memory). Consequently, in these embodiments, the transfer circuitry causes the requested data to move further from the main memory and closer to the processing circuitry thereby reducing the memory latency for when the data is ultimately requested. However, at the time that the transfer circuitry makes the request, the data is not being transferred all the way to the storage circuitry.

In some embodiments, the selected destination is a Last Level Cache (LLC). An LLC is considered to be the storage circuit (e.g. cache) that is nearest to the main memory. In some embodiments, the LLC is shared between a number of processor cores. However, this is not necessary, and in some other embodiments, the LLC is dedicated to a particular processor core.

In some embodiments, in response to an acknowledgement from the other storage circuitry that the other storage circuitry is to act as the selected destination of the data, the storage circuitry is adapted to respond to the request by indicating that the request is resolved. When a request to receive data is received by the receiver circuitry, an entry may be stored in the tracker circuitry until that request has been resolved. If the transfer circuitry then causes the data to be fetched and stored in the other storage circuitry, then that other storage circuitry will fetch the data and once the request to fetch that data has been received, the other storage circuitry may respond with an acknowledgement indicating that the request for that data to be obtained has been received. At this point, the initial request that was made to the storage circuitry to obtain the data has been resolved since it has been converted into a different request to be satisfied by different storage circuitry. Consequently, the entry in the tracker circuitry of the storage circuitry can be removed. It will be appreciated that since the data need not be retrieved by the storage circuitry, in many cases this will cause the entry in the tracker circuitry to be stored for a substantially smaller period of time than if data had to be obtained by and stored in the storage circuitry. For instance, the period of time take for a level 2 cache to cause a level 3 cache to obtain data from main memory would be expected to be smaller than the period of time taken for the level 2 cache to obtain the data from main memory itself. The length of time the individual entry is stored in the tracker circuitry can therefore be reduced even though the request is being satisfied and consequently other requests can be satisfied by the storage circuitry at the same time thereby increasing the overall bandwidth of the memory hierarchy.

In some embodiments, when the storage circuitry is selected to be the selected destination of the data, the transfer circuitry is adapted to indicate that the request is resolved in response to the data being obtained. Where the transfer circuitry causes the storage circuitry itself to obtain and store the data, the request can be considered to be resolved when the data has been obtained by the storage circuitry. At this point, the request for the storage circuitry to obtain the data as received by the receiver circuitry has been resolved and so the entry can be removed.

In some embodiments, the storage circuitry comprises inhibition circuitry to inhibit, in response to at least one inhibition condition being met, the transfer circuitry from selecting the other storage circuitry as the selected destination. In some situations, even if the at least one condition is not met, then it may be undesirable for the selected storage circuit to be anything other than the storage circuitry. For instance, even where the condition is not met, it may be undesirable for the storage circuitry to convert a request for the storage circuitry to obtain data into a request for another storage circuit to obtain that data. Accordingly, the inhibition circuitry is provided in order to cause this situation to be inhibited in response to the at least one inhibition condition being met.

There are a number of situations in which the inhibition condition is met. In some embodiments, the at least one inhibition condition comprises a condition that a utilisation level of an other tracking circuitry of the other storage circuitry is above a predetermined utilisation limit. If tracking circuitry (e.g. a request buffer) of the other circuitry is above a particular utilisation limit then causing the other storage circuitry to fetch the data and store it is unlikely to succeed. It will be appreciated that there is a limit to the number of conversions of incoming requests for data that can be converted by the storage circuitry. Therefore when this limit is reached (e.g. when the utilisation limit is reached) it may be inappropriate to perform further conversions.

As an alternative or in addition to the above, in some embodiments, the at least one inhibition condition comprises a condition that a usage level of the other storage circuitry by a neighbouring storage circuit is above a predetermined usage limit. A neighbour of a storage circuit can be considered to be a storage circuit that appears at the same level of that storage circuit in the memory hierarchy. For instance, the neighbours of a level 1 cache would be other level 1 caches. In this way, if the usage level of the other storage circuitry by a neighbour of the storage circuit is above a predetermined usage limit (e.g. 50%) then it may be assumed that the other storage circuitry is being heavily relied upon by that neighbour and it may therefore be inappropriate to use the other storage circuitry for offloading of data requests.

In some embodiments, the storage circuitry comprises prefetch control circuitry to cause a higher level storage circuit in the memory hierarchy than the storage circuitry to use a higher prefetch distance in respect of the data when the selected destination is the other storage circuitry.

In some embodiments, the prefetch control circuitry is adapted to cause the higher level storage circuit in the memory hierarchy to use a lower prefetch distance in respect of the data when the selected destination is the storage circuitry. It will be appreciated that where the selected storage circuit is the other storage circuitry, the requested data will be stored further away from the processor core than if the selected storage circuit is the storage circuitry itself. Accordingly, where a further access request for the data is made, the access must allow for a higher memory latency. In the form of a prefetch, this is represented by the prefetch distance being increased. In particular, where prefetching occurs, the data will be prefetched further ahead of where it would ordinarily be fetched in order to compensate for the fact that the data will take a longer time to be fetched from the further (other) storage circuit.

In some embodiments, the storage circuitry comprises prefetch control circuitry to cause an origin of the request to issue a further request for the storage circuitry to obtain the data from the memory hierarchy in response to the selected destination being the other storage circuitry. When the request is converted (e.g. when the request causes the transfer circuitry to select the other storage circuitry as the selected storage circuit) the data is fetched into different storage circuitry. Consequently, prefetch control circuitry can be provided in order to signal the origin of the request for issue a further request for the storage circuitry to obtain the data from the memory hierarchy. This has the effect that the first request will cause the data to move up the memory hierarchy, and the further request will cause the data to move further up the memory hierarchy. Furthermore, by splitting the request for the data to be obtained by the storage circuitry into two requests, the length of time for which a particular request will be represented in the tracker circuitry can be reduced overall. By potentially reducing this time as well as splitting the time in half, it is possible to be more flexible with requests in the memory hierarchy and consequently the overall bandwidth of the memory hierarchy can be improved.

Particular embodiments will now be described with reference to the figures.

FIG. 1 illustrates a system comprising a memory hierarchy 100. Within the system, processor cores 110*a*, 110*b* each execute sets of instructions. As a consequence of these one or more instructions being executed, a corresponding load/store unit 120*a*, 120*b* can be made to issue requests for data to be fetched from the memory hierarchy 100. These requests are passed through the memory hierarchy 100 until the requested data is located, at which point the data is returned to the load/store unit 120*a*, 120*b* in order to be processed by the corresponding processor core 110*a*, 110*b*. The memory hierarchy 100 includes a level 1 cache 130*a*, 130*b*, which is unique to each of the processor cores 110*a*, 110*b*. The memory hierarchy 100 also includes a level 2 cache 140*a*, 140*b*, again unique to each of the processor cores 110*a*, 110*b*. The level 2 cache 140*a*, 140*b* is bigger than the level 1 cache 130*a*, 130*b* and thus can store more data. As a consequence of its larger size, the level 2 cache 140*a*, 140*b* is also slower. The level 2 cache 140*a*, 140*b* is said to be lower in the hierarchy than the level 1 cache 130*a*, 130*b* since it is closer to the main memory 160 and is further from the processor cores 110*a*, 110*b*.

A request from the load/store unit 120*a*, 120*b* is initially passed to the level 1 cache 130*a*, 130*b* where the requested data is returned if that data is present in the level 1 cache 130*a*, 130*b*. However, owing to the smaller size of the level 1 cache 130*a*, 130*b* only frequently or recently accessed data is likely to be stored here. Consequently, if a "miss" occurs on the level 1 cache 130*a*, 130*b*, then the request is forwarded to a level 2 cache 140*a*, 140*b* for the requested data. If the request "misses" on the level 2 cache 140*a*, 140*b*, then it is forwarded to the level 3 cache 150. In this example, the level 3 cache is shared between the processor cores 110*a*, 110*b*. In other words, data that is accessed by one of the processor cores and stored in the level 3 cache 150 may be accessible by the other processor core 110*b*. The level 3 cache is larger and slower than even the level 2 caches 140*a*, 140*b* and is lower in the hierarchy (being closer to the main memory 160). The main memory 160 is shared between the processor cores 110*a*, 110*b* and may be backed by, for instance, DRAM. The main memory is typically the slowest of the storage circuits that make up the memory hierarchy 100.

FIG. 1 also illustrates the concept of neighbouring storage circuits. In particular, the concept of a neighbouring storage circuit includes a storage circuit at the same level in the memory hierarchy 100. For instance, in this example, the level 2 cache 140*b* neighbours the other level 2 cache 140*a*.

Within this system, prefetching may be used in order to reduce memory latencies. When a processor core 110*a* executes an instruction that explicitly accesses data that is stored in the main memory 160 it will be appreciated that the load/store unit 120*a* may have to forward a request that passes through the level 1 cache 130*a*, the level 2 cache 140*a*, and the level 3 cache 150 to the main memory 160. The main memory must then search for the requested data and forward the data back through this chain of storage circuits back to the load/store unit 120*a*. Even if the intermediate storage circuits 130*a*, 140*a*, 150 can be circumvented, as a consequence of being larger and therefore slower, the amount of time required to fetch the requested data and return it to the load/store unit 120*a* can be high. Consequently, the concept of prefetching can be used. In a prefetcher system, the sequence of explicitly requested memory addresses can be analysed in order for a pattern to be established. When such a pattern has been established, it is possible to pre-emptively request data from the memory hierarchy 100 such that the data can be made available in a higher level cache of the memory hierarchy 100 at the time it is explicitly requested. Consequently, the time taken between the explicit request for that data coming in at the load/store unit 120*a* and it actually being returned to the load/store unit 120*a* can be significantly reduced. Prefetching can occur at each level of the memory hierarchy. For instance, data may be prefetched into the level 2 cache 140*a* as well as the level 1 cache 130*a* and the level 3 cache 150, or data could be prefetched up through the memory hierarchy at different stages (i.e. at different times in advance of the data being explicitly requested). Although not relevant to the present technique, different strategies and parameters may be considered for determining when a prefetch occurs, how proactively to obtain data, and how readily a particular pattern should be established.

It will be appreciated that passing messages between different parts of the memory hierarchy 100 uses bandwidth. In many instances it is desirable to make good use of the available memory bandwidth.

Figure 2:
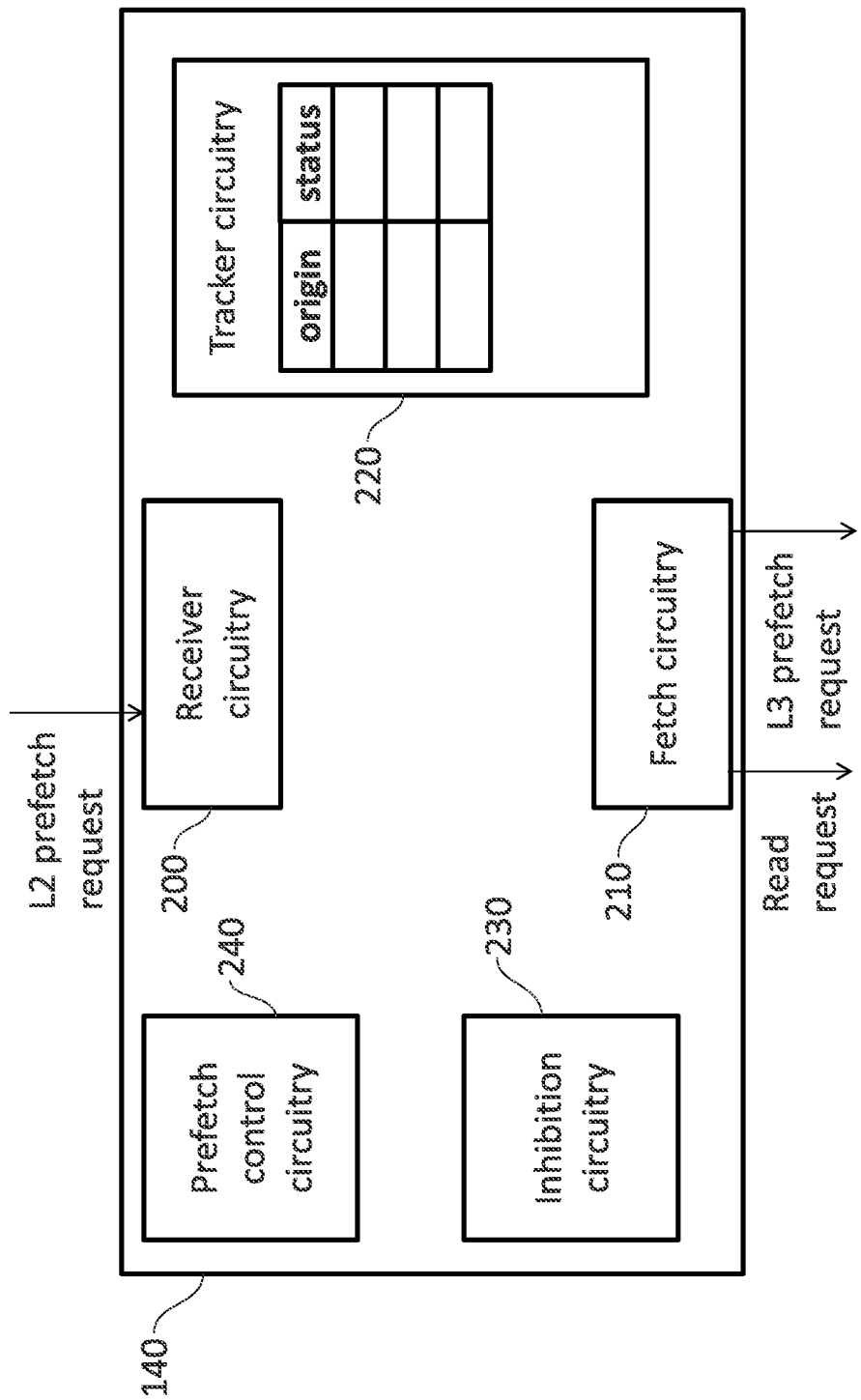
FIG. 2 illustrates storage circuitry in accordance with some embodiments.

FIG. 2 illustrates storage circuitry in the form of a level 2 cache 140. The storage circuitry includes receiver circuitry 200 that is responsible for receiving requests to obtain data. The request could be in the form of an explicit request for a prefetch request. The storage circuitry 140 also includes fetch circuitry 210, which is an example of the claimed transfer circuitry. The transfer/fetch circuitry 210 is responsible for issuing requests for data to the rest of the memory hierarchy 100. Again, the requests could take the form of a prefetch request or an explicit request. In particular, the request could also be directed to another storage circuit to obtain particular data. For instance, the fetch circuitry 210 of a level 2 cache 140 could issue a level 3 prefetch request thereby causing a level 3 cache to pre-emptively obtain data and store it. Tracker circuitry 220 is provided in order to keep track of all of the unresolved requests that have been received by the receiver circuitry 200. In general, a request will be considered unresolved until such time as the requested data has been obtained by the target storage circuitry or until the request has been converted (e.g. a level 2 cache 140 may receive a level 2 prefetch request which is converted into a level 3 prefetch request thereby causing a level 3 cache 150 to prefetch the data). Once this conversion has taken place, the initial request that was received by the receiver circuitry 200 can be considered to be resolved. The tracker circuitry 220 keeps track of requests that are considered to be "in-flight". In the example shown in FIG. 2, the tracker circuitry includes table storage circuitry that stores a number of entries each corresponding to received requests that are outstanding. The table includes an origin which represents the identifier of the circuitry that initiated the request that was received by the receiver circuitry 200 and a status field that indicates the status of the request. For instance, the status field may indicate whether the request is being directly dealt with or whether the request has been converted and an acknowledgement of the conversion is still waiting. Inhibition circuitry 230 can be used to inhibit the conversion of access requests that are received by the receiver circuitry 200. When inhibited, any request that is received by the receiver circuitry 200 must be handled by the storage circuitry 140 itself. In addition, prefetch control circuitry 240 can be used to communicate with storage circuits that are higher up in the memory hierarchy 100 in order to control the manner in which prefetches are performed. Such control can include extending the prefetched distance and also explicitly causing further prefetch requests to be issued. It will be appreciated that the tracker circuitry 220 stores an entry for each received request by the receiver circuitry 200. As a consequence, once the tracker circuitry 220 is full it may not be possible for further requests to be pursued. The tracker circuitry 220 therefore represents a choke point with respect to the bandwidth that can be achieved in the memory hierarchy 100. In particular, if each outstanding request in the tracker circuitry 220 results in data being transferred through the memory hierarchy 100 then once the tracker circuitry 220 is full, further data transfers cannot take place. It has been previously proposed that the tracker circuitry 220 could be extended in order to enable more requests to be outstanding and therefore make better use of the available bandwidth. However, this would increase the circuit size of the tracker circuitry 220, which would in turn cause the power consumption of the storage circuitry 140 to increase and may increase the time taken to handle incoming requests which must be searched for in a bigger storage structure.

Figure 3:
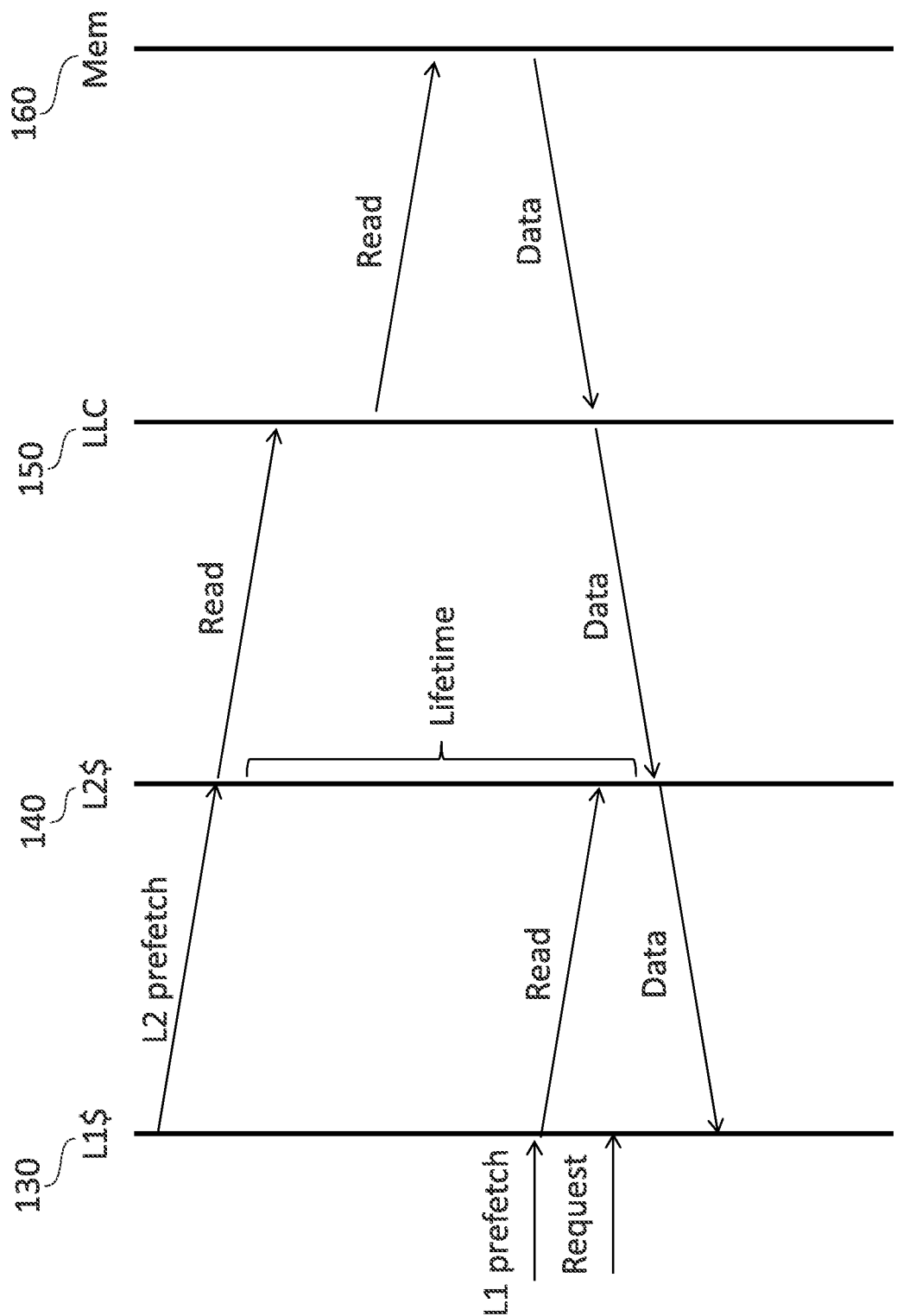
FIG. 3 illustrates an exchange of communications between components in a memory hierarchy.

FIG. 3 illustrates a communication flow diagram that illustrates a series of communications that may be exchanged between a level 1 cache 130, a level 2 cache 140, a Last Level Cache 150, and a main memory 160. In this example, the Last Level Cache (LLC) could be considered to be the level 3 cache 150 illustrated in FIG. 1. The LLC is considered to be the last cache in the memory hierarchy before the main memory 160.

In this example, the level 1 cache 130 issues a level 2 prefetch request to the level 2 cache 140. This causes the level 2 cache's fetch circuitry 210 to issue a read request to the main memory 160 via the LLC 150. Note that as illustrated in FIG. 3, there is a gap between the read request being received by the LLC 150 and it being issued onto the main memory 160 as a consequence of the LLC 150's slowness. A similar delay is experienced by the main memory 160. Having located the data in the main memory 160, the data is returned to the level 2 cache 140 via the LLC 150. At this point, the level 2 prefetch request issued by the level 1 cache 130 is considered to be resolved and the lifetime of that request is illustrated in FIG. 3. During this time, a level 1 prefetch request is issued by the level 1 cache 130, and this is followed shortly thereafter by an explicit request for the data. Once the data is received by the level 2 cache 140 it is provided onwards to the level 1 cache 130.

It will be appreciated that as a consequence of this process, the lifetime of the request that is received by the level 2 cache 140 is relatively extensive.

Figure 4:
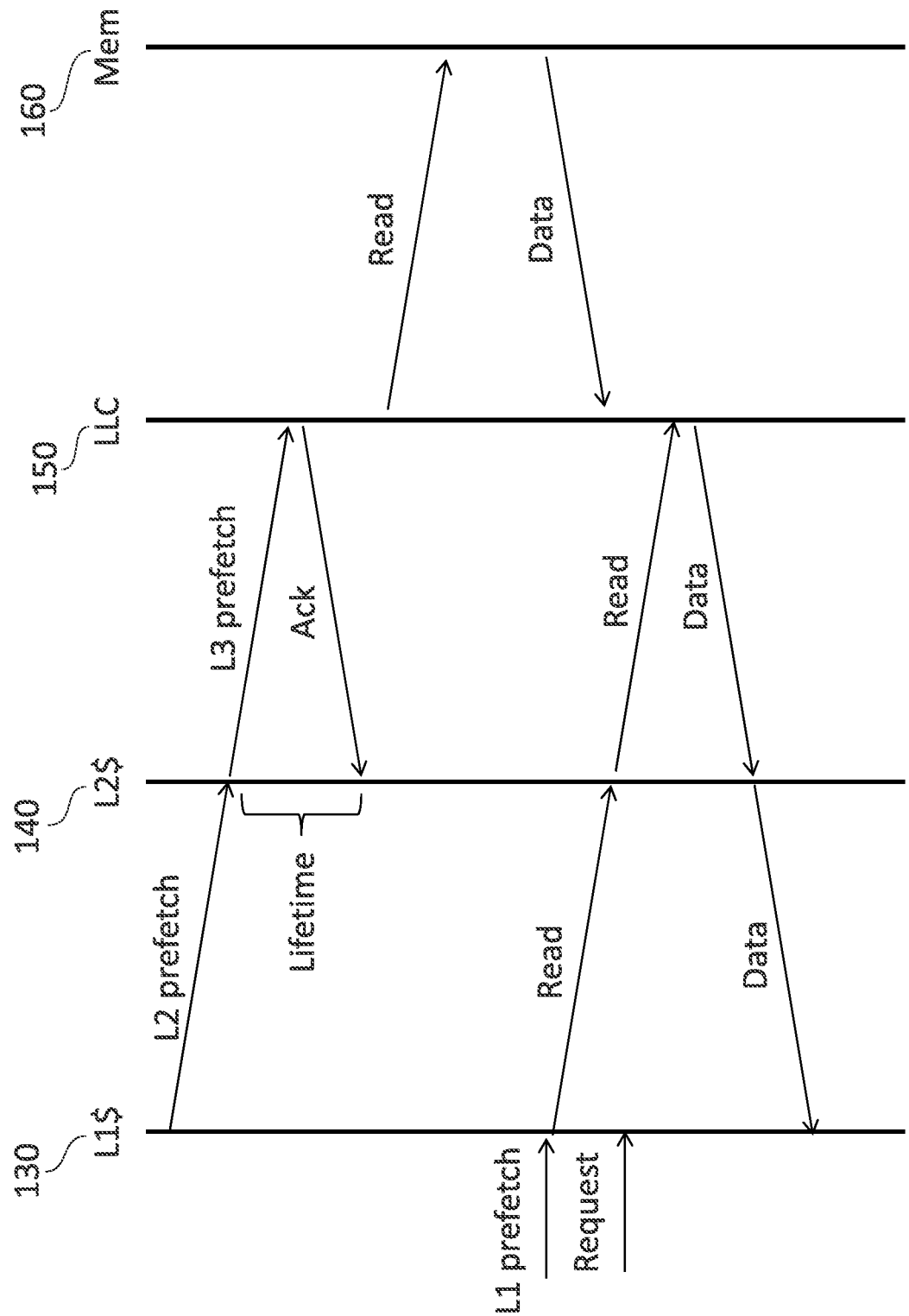
FIG. 4 illustrates another exchange of communications between components in a memory hierarchy in accordance with some embodiments.

FIG. 4 illustrates another way in which the request can be handled in accordance with some embodiments. In particular, the level 2 prefetch request is again received by the level 2 cache 140 for the level 1 cache 130. However, in this example, the request is converted to a level 3 prefetch request that is issued to the LLC 150. The LLC 150 responds with an acknowledgement. This acknowledgement, once received by the level 2 cache 140, causes the level 2 prefetch request to be resolved. This is because the level 2 prefetch request has been handled by virtue of it being validly converted into a level 3 prefetch request. The level 3 prefetch request is then handled by the LLC 150 issuing a read request to memory 160 which promptly returns the data. The data is then stored in the LLC 150. Again, a level 1 prefetch request is issued by the level 1 cache 130, which is shortly followed by an explicit request from the data that is issued to the level 1 cache 130. This time, since the data is not stored in the level 2 cache 140, the level 1 prefetch request causes data to be read from the LLC 150 via the level 2 cache 140. The data is then returned to the level 1 cache 130 via the level 2 cache 140.

It will be appreciated that as a consequence of this process, the lifetime of the level 2 prefetch request is significantly shorter. Consequently, the tracker circuitry 220 of the level 2 cache 140 can be cleared more quickly thereby enabling more bandwidth of memory hierarchy 100 to be used. In particular, this is achieved by virtue of corresponding tracker circuitry at the LLC 150 being used by the level 2 cache 140. In the time that is saved, another request can be tracked by the tracker circuitry—this allows more activity to take place in the hierarchy 100 at once, effectively increasing the bandwidth of the memory hierarchy 100.

Figure 5:
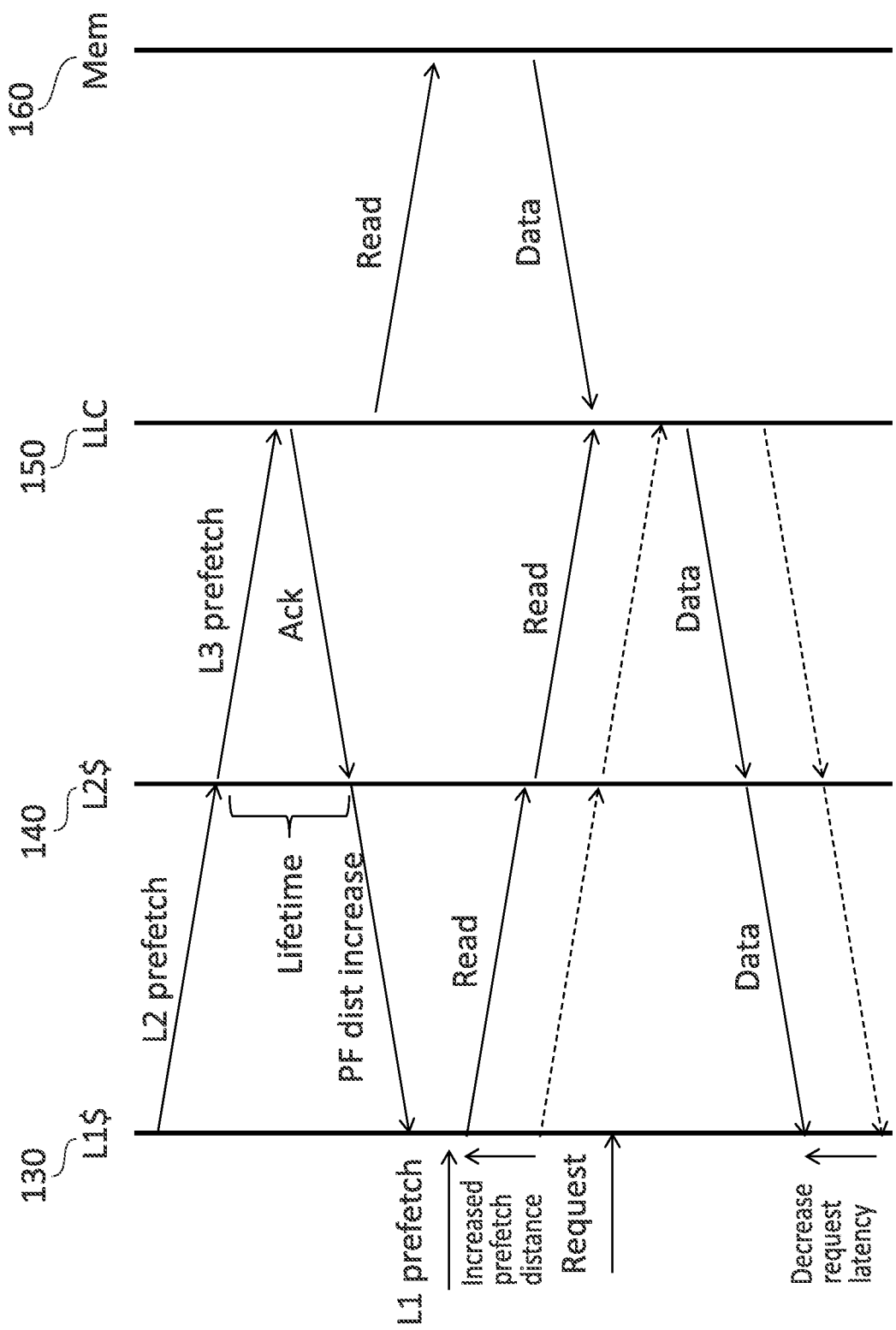
FIG. 5 illustrates an increased prefetch distance that occurs under particular circumstances in some embodiments.

FIG. 5 illustrates a variant in which potentially increased memory latency can be compensated for. In this embodiment, after the acknowledgement is received by the level 2 cache 140, the prefetch control circuitry 240 of the level 2 cache 140 issues a prefetch distance increase signal back to the level 1 cache 130. In this case, the level 1 cache 130 itself is the source of the level 1 prefetch. This signal causes the distance of the prefetch request that is issued in respect of the data that was the subject of the level 2 prefetch request to be increased. As a consequence, the level 1 prefetch for the requested data occurs earlier and thus, the data is returned more quickly to the level 1 cache 130 than would be achieved if the existence had not been increased. It will be appreciated that when the conversion of the level 2 prefetch request to the level 3 prefetch request does not occur, the prefetch distance may be decreased back to its previous value. For instance, the increased prefetch distance may be a distance of 12 while the decreased prefetch distance may be a distance of 7.

Figure 6:
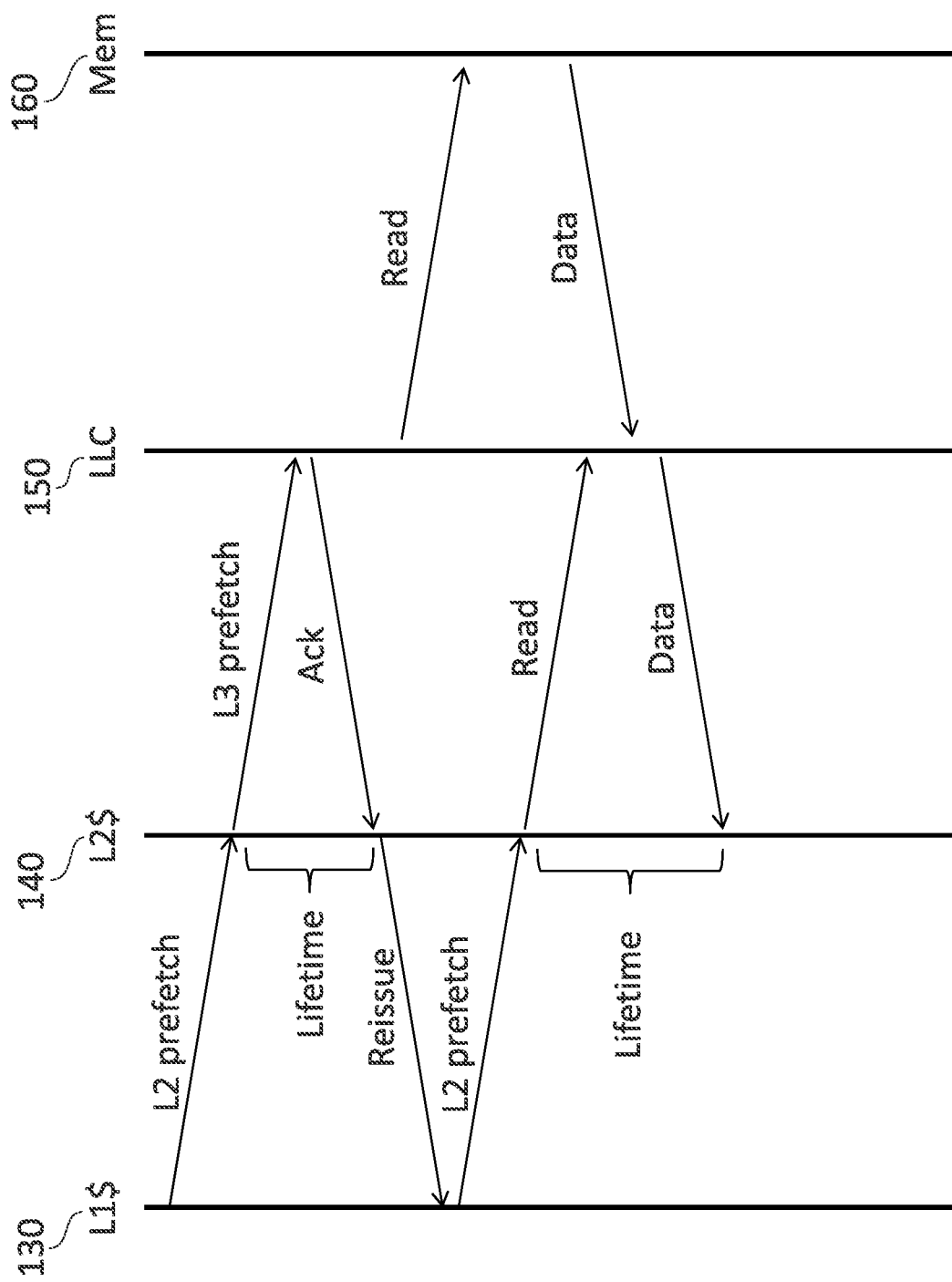
FIG. 6 illustrates a still further exchange of communications between components in a memory hierarchy in accordance with some embodiments.

FIG. 6 illustrates an embodiment in which the prefetch control circuitry 240 of the level 2 cache 140 can be used in order to prompt a further prefetch request in order to continue to move the requested data further up the memory hierarchy 100. In this example, after having received the acknowledgement at the level 2 cache 140, the prefetch control circuitry 240 issues a reissue signal to the level 1 cache 130. This causes a further level 2 prefetch request in respect of the same data to be issued by the level 1 cache 130 to the level 2 cache 140. As a consequence, this time, the prefetch request is not converted, and instead a read request is issued by the level 2 cache 140 to the LLC 150 where the data resides or will reside as a consequence of the previous L3 prefetch request. As a result of this second prefetch request, the data is moved further up the hierarchy from the memory 160 to the LLC 150 (by virtue of the first prefetch) and then from the LLC 150 to the Level 2 cache 140 by virtue of the second prefetch request. This results in two different entries being stored in the tracker circuitry 220 of the level 2 cache. However, due to the shorter latencies experienced as a consequence of only issuing signals to a neighbouring storage circuit, the overall lifetime of these requests is expected to be shorter than the lifetime illustrated with respect of FIG. 3. In addition, by splitting the lifetime in half, greater flexibility regarding the storage of the tracker circuitry 220 may be expected. In addition, in this example, the data is stored in the level 2 cache 140 nearer to the processor core.

Figure 7:
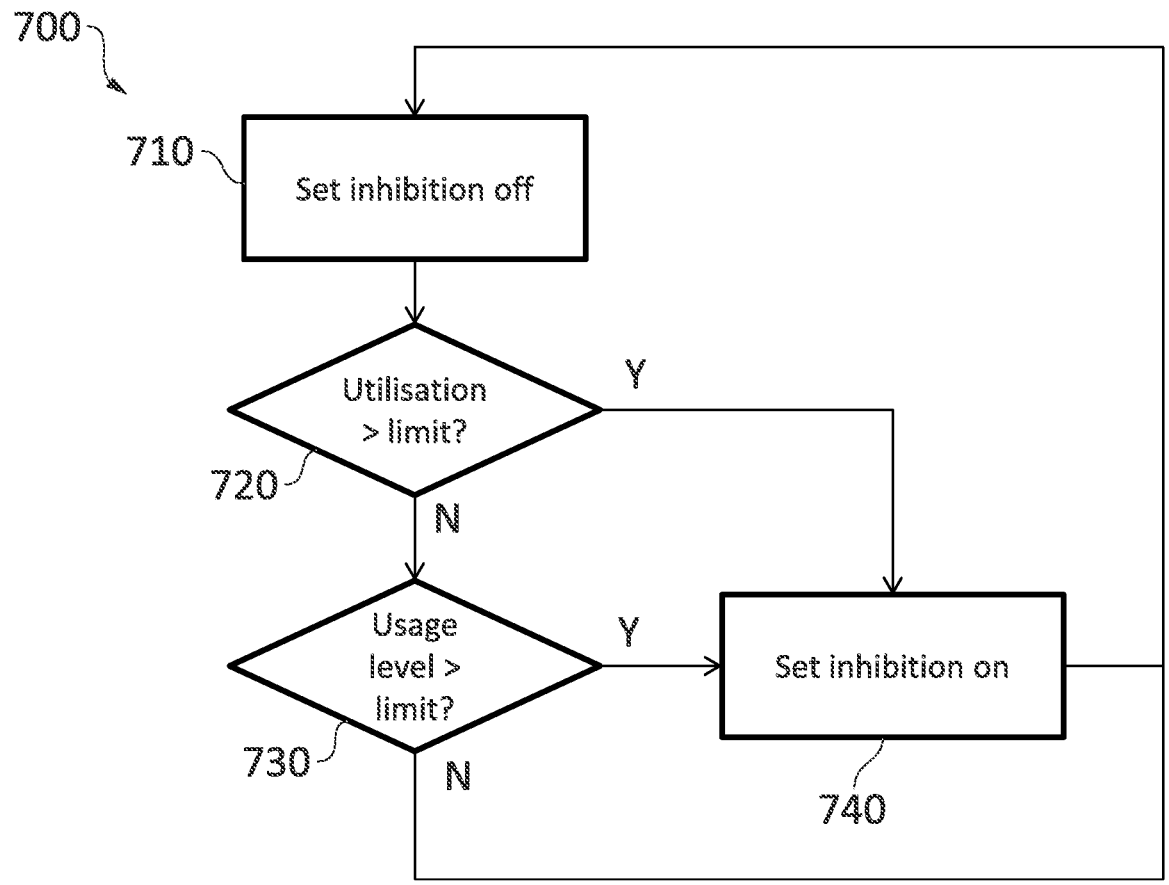
FIG. 7 shows a flowchart that illustrates a method of inhibiting or allowing the present technique in accordance with some embodiments.

FIG. 7 illustrates a flow chart 700 that describes the process of using inhibition as may be performed by the inhibition circuitry 230. At a step 710, inhibition is deactivated. At a step 720, it is determined whether the utilisation of the lower level caches own tracker circuitry is above some limit (e.g. 75% or 85% or 90%). If so, then inhibition is activated at step 740. Inhibition may also be activated at step 740 if the usage level of a neighbouring cache of the lower level cache is above some limit (e.g. 40% or 50%). If neither of these conditions is met, then inhibition remains off. For instance, taking the example shown in FIG. 1, if the tracker circuitry of the level 3 cache 150 is above 90%, then the level 2 caches 140a, 140b will not be able to convert received requests into level 3 requests. Similarly, if the usage level of the level 3 cache 150 by the level 2 cache 140b is above 50%, then the other level 2 cache 140a will be unable to convert requests into level 3 requests.

The first of these situations represents the situation in which conversion may not be possible. In particular, if the lower level cache does not have the ability to perform a request because its own tracker circuitry is nearly full, then it would be inappropriate to convert the request.

In the second example, if another cache is already making heavy use of the lower level cache (e.g. if the level 2 cache 140b is making heavy use of the level 3 cache 150) then again it may be considered to be inappropriate for another level 2 cache 140a to begin converting requests. Accordingly, conversion should be inhibited in these cases.

Figure 8:
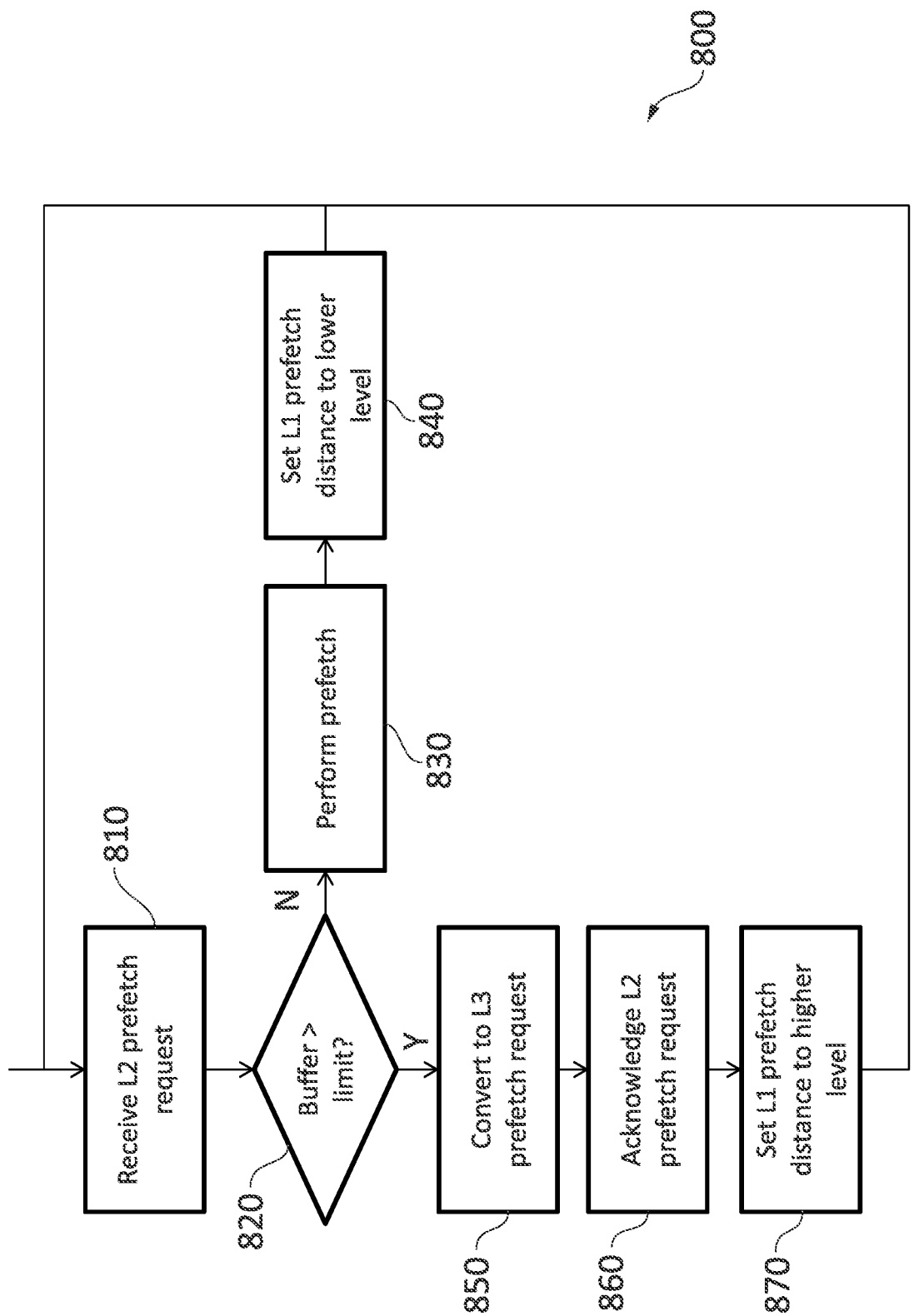
FIG. 8 shows a flowchart that illustrates a method in accordance with some embodiments.

FIG. 8 shows a flow chart 800, which illustrates a process of adjusting the prefetch distance. At a step 810, a level 2 prefetch request is received (e.g. by the level 2 cache 140). At a step 820, it is determined whether the occupancy of the request buffer (e.g. tracker circuitry 220) is above a predetermined limit (e.g. 90%). If not, then the prefetch is performed as normal at step 830, and the prefetch control circuitry 240 may signal the origin of the request such as the level 1 prefetcher to set the prefetched distance to the normal (e.g. lower) level. The process then returns to step 810. If the occupancy of the tracker circuitry 220 is above the limit, then at step 850, the level 2 prefetch request is converted to a level 3 prefetch request and forwarded to the level 3 cache 150. Once an acknowledgement is received, then at step 860, the original level 2 prefetch request is acknowledged, and the prefetch control circuitry 240 of the level 2 cache 140 can issue a signal to the level 1 prefetcher to increase the level 1 prefetched distance to the higher level (e.g. 12) at step 870. This change can be performed in order to compensate for the higher memory latency that is likely to occur. The process then returns to step 810.

It will be appreciated that where no change to the prefetched distance occurs, no signal necessarily need be issued by the prefetch control circuitry 240.

Accordingly, it can be seen that by handling the occupancy of the tracker circuitry 220 (e.g. by converting requests so as for those requests to be handled by lower level caches) more requests can be in-flight at the same time and consequently a bandwidth of the memory hierarchy can be improved.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. Storage circuitry to form part of a memory hierarchy, the storage circuitry comprising:
   receiver circuitry to receive a request to obtain data from the memory hierarchy;
   transfer circuitry to cause the data to be stored at a selected destination in response to the request, wherein the selected destination is selected in dependence on at least one selection condition; and
   tracker circuitry to track the request while the request is unresolved;

wherein
if the at least one selection condition is met then the selected destination is the storage circuitry and otherwise the selected destination is other storage circuitry in the memory hierarchy; and the storage circuitry comprises prefetch control circuitry to cause a higher level storage circuit in the memory hierarchy than the storage circuitry to use a higher prefetch distance with respect to the data when the selected destination is the other storage circuitry.

2. The storage circuitry according to claim 1, wherein the at least one selection condition comprises a condition that an occupancy of the tracker circuitry is below a predetermined level.

3. The data processing apparatus according to claim 1, wherein
the request to obtain data from the memory hierarchy is a prefetch request.

4. The storage circuitry according to claim 1, wherein
the selected destination is the other storage circuitry; and
the selected destination is lower in the memory hierarchy than the storage circuitry.

5. The storage circuitry according to claim 1, wherein
the selected destination is a last level cache.

6. The storage circuitry according to claim 1, wherein
in response to an acknowledgement from the other storage circuitry that the other storage circuitry is to act as the selected destination of the data, the storage circuitry is adapted to respond to the request by indicating that the request is resolved.

7. The storage circuitry according to claim 1, wherein
when the storage circuitry is selected to be the selected destination of the data, the transfer circuitry is adapted to indicate that the request is resolved in response to the data being obtained.

8. The storage circuitry according to claim 1, comprising:
inhibition circuitry to inhibit, in response to at least one inhibition condition being met, the transfer circuitry from selecting the other storage circuitry as the selected destination.

9. The storage circuitry according to claim 8, wherein
the at least one inhibition condition comprises a condition that a utilisation level of an other tracking circuitry of the other storage circuitry is above a predetermined utilisation limit.

10. The storage circuitry according to claim 8, wherein
the at least one inhibition condition comprises a condition that a usage level of the other storage circuitry by a neighbouring storage circuit is above a predetermined usage limit.

11. The storage circuitry according to claim 1, wherein
the prefetch control circuitry is adapted to cause the higher level storage circuit in the memory hierarchy to use a lower prefetch distance in respect of the data when the selected destination is the storage circuitry.

12. The storage circuitry according to claim 1, comprising:
prefetch control circuitry to cause an origin of the request to issue a further request for the storage circuitry to obtain the data from the memory hierarchy in response to the selected destination being the other storage circuitry.

13. A method comprising:
receiving, at storage circuitry, a request to obtain data from a memory hierarchy;
selecting a selected destination in the memory hierarchy in dependence on at least one selection condition;
causing the selected destination to obtain the data;
tracking the request while the request is unresolved;
wherein
if at least one selection condition is met then the selected destination is the storage circuitry and otherwise the destination is other storage circuitry; and
causing a higher level storage circuit in the memory hierarchy than the storage circuitry to use a higher prefetch distance with respect to the data when the selected destination is the other storage circuitry.

14. Storage circuitry to form part of a memory hierarchy, the storage circuitry comprising:
means for receiving, at storage circuitry, a request to obtain data from a memory hierarchy;
means for selecting a selected destination in the memory hierarchy in dependence on at least one selection condition;
means for causing the selected destination to obtain the data;
means for tracking the request while the request is unresolved;
wherein
if at least one selection condition is met then the selected destination is the storage circuitry and otherwise the destination is other storage circuitry; and
means for causing a higher level storage circuit in the memory hierarchy than the storage circuitry to use a higher prefetch distance with respect to the data when the selected destination is the other storage circuitry.

* * * * *